(12) United States Patent
Holness

(10) Patent No.: US 10,826,813 B2
(45) Date of Patent: *Nov. 3, 2020

(54) THRESHOLD CROSSING EVENTS FOR NETWORK ELEMENT INSTRUMENTATION AND TELEMETRIC STREAMING

(71) Applicant: Ciena Corporation, Hanover, MD (US)

(72) Inventor: Marc Holness, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,353

(22) Filed: Apr. 17, 2019

(65) Prior Publication Data
US 2019/0245769 A1 Aug. 8, 2019

Related U.S. Application Data

(63) Continuation of application No. 15/489,515, filed on Apr. 17, 2017, now Pat. No. 10,291,509.

(51) Int. Cl.
*H04L 12/26* (2006.01)
*H04L 12/863* (2013.01)
*H04Q 3/00* (2006.01)
*H04L 12/24* (2006.01)
*H04L 12/801* (2013.01)

(52) U.S. Cl.
CPC .......... *H04L 43/16* (2013.01); *H04L 41/0681* (2013.01); *H04L 43/04* (2013.01); *H04L 43/08* (2013.01); *H04L 43/0894* (2013.01); *H04L 47/6255* (2013.01); *H04Q 3/0062* (2013.01); *H04L 47/127* (2013.01)

(58) Field of Classification Search
CPC ..... H04L 43/16; H04L 43/04; H04L 43/0894; H04L 12/26; H04L 12/863; H04L 12/24; H04L 47/6255; H04L 41/0681; H04Q 9/00; H04Q 2209/10
See application file for complete search history.

(56) References Cited

U.S. PATENT DOCUMENTS

| | | | |
|---|---|---|---|
| 6,654,803 B1 * | 11/2003 | Rochford | H04L 41/22 345/418 |
| 7,535,923 B2 * | 5/2009 | Ward | H04L 43/00 370/378 |
| 7,676,562 B2 * | 3/2010 | Reistad | H04L 41/0233 709/223 |

(Continued)

*Primary Examiner* — Alina A Boutah
(74) *Attorney, Agent, or Firm* — Clements Bernard Walker; Lawrence A. Baratta, Jr.; Christopher L. Bernard

(57) ABSTRACT

A network device includes a plurality of ports; a switch configured to switch data frames between the plurality of ports; and a processor configured to obtain one or more measurement values based on network traffic associated with the data frames, responsive to detection of a threshold-crossing event of a measurement value, wherein the threshold-crossing event is one of an indication and a precursor of one or more of an abnormal and unexpected event associated with the network traffic, cause collection of a plurality of time series of measurement values of the network traffic by one or more components in the network device, and send a combination of the plurality of time series as a telemetric data stream for analysis by a network management system related to the abnormal/unexpected event.

20 Claims, 6 Drawing Sheets

(56) References Cited

U.S. PATENT DOCUMENTS

| | | | | |
|---|---|---|---|---|
| 7,860,682 B2* | 12/2010 | Hamilton | | G05B 23/0251 702/183 |
| 7,970,890 B1* | 6/2011 | Krivopaltsev | | H04L 41/5035 370/241 |
| 10,511,498 B1* | 12/2019 | Narayan | | H04L 61/1511 |
| 2002/0178258 A1* | 11/2002 | Hushing, III | | H04Q 9/02 709/224 |
| 2005/0076238 A1* | 4/2005 | Ormazabal | | H04L 43/06 726/4 |
| 2005/0083920 A1* | 4/2005 | Barri | | H04L 47/10 370/360 |
| 2005/0154557 A1* | 7/2005 | Ebert | | G06F 11/3438 702/182 |
| 2008/0001776 A1* | 1/2008 | Gross | | H04Q 9/00 340/870.01 |
| 2008/0043716 A1* | 2/2008 | Toombs | | H04L 45/00 370/351 |
| 2008/0049641 A1* | 2/2008 | Edwards | | H04L 12/66 370/253 |
| 2013/0204997 A1* | 8/2013 | Eggleston | | H04L 41/5009 709/223 |
| 2014/0328196 A1* | 11/2014 | Arad | | H04L 41/147 370/252 |
| 2015/0015376 A1* | 1/2015 | Jenkins | | H04Q 9/00 340/12.5 |
| 2015/0215841 A1* | 7/2015 | Hsu | | H04L 43/12 370/328 |
| 2016/0094401 A1* | 3/2016 | Anwar | | G06F 11/3006 709/223 |
| 2016/0359697 A1* | 12/2016 | Scheib | | G06F 16/17 |
| 2017/0155668 A1* | 6/2017 | Bartos | | H04L 63/1416 |
| 2017/0324537 A1* | 11/2017 | Liaghati | | H04L 1/0006 |
| 2018/0006900 A1* | 1/2018 | Korycki | | H04L 41/064 |
| 2018/0098136 A1* | 4/2018 | Krithivas | | H04Q 9/00 |
| 2018/0112990 A1* | 4/2018 | Fowe | | G01C 21/3484 |
| 2018/0218034 A1* | 8/2018 | Sainaney | | G06F 16/24568 |

* cited by examiner

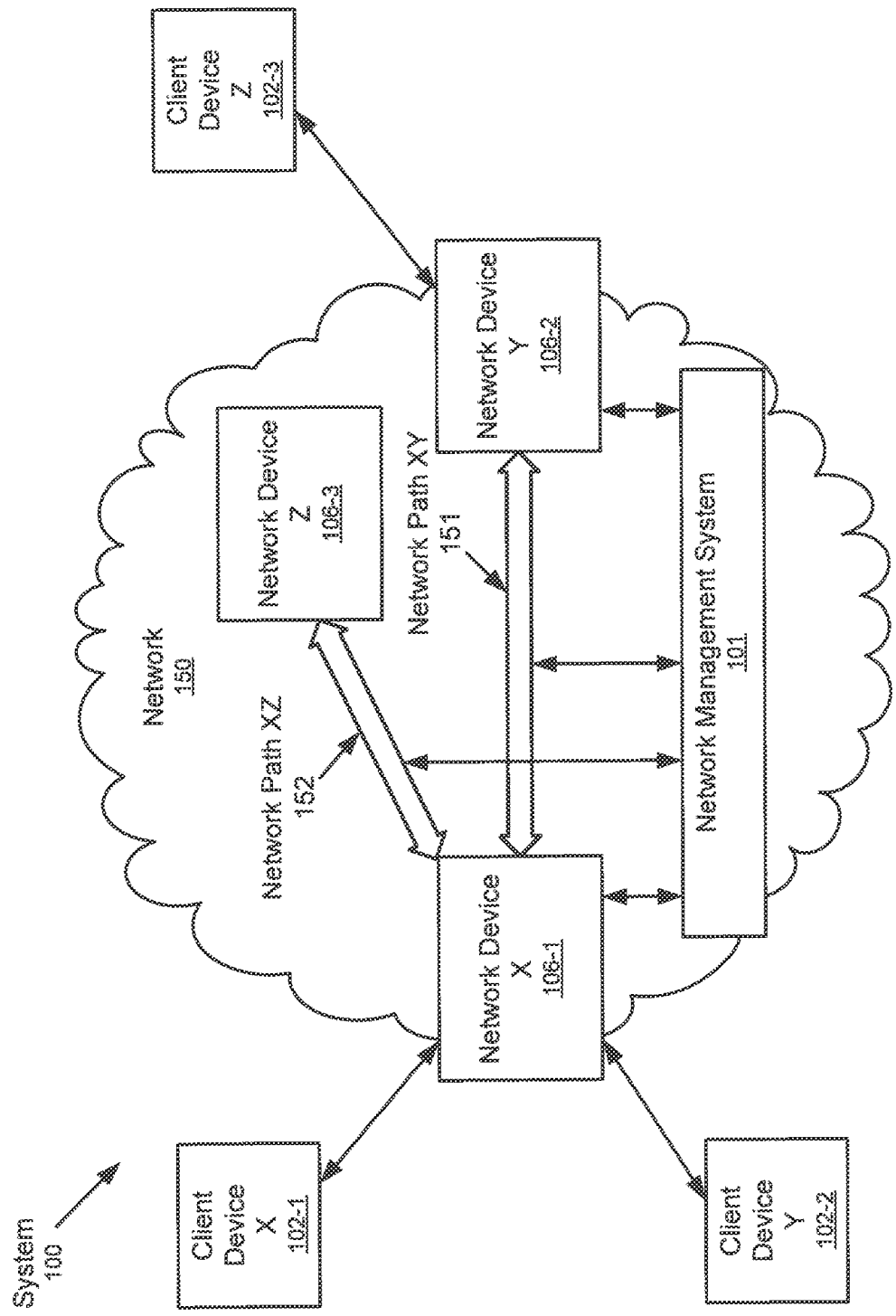
FIG. 1.1

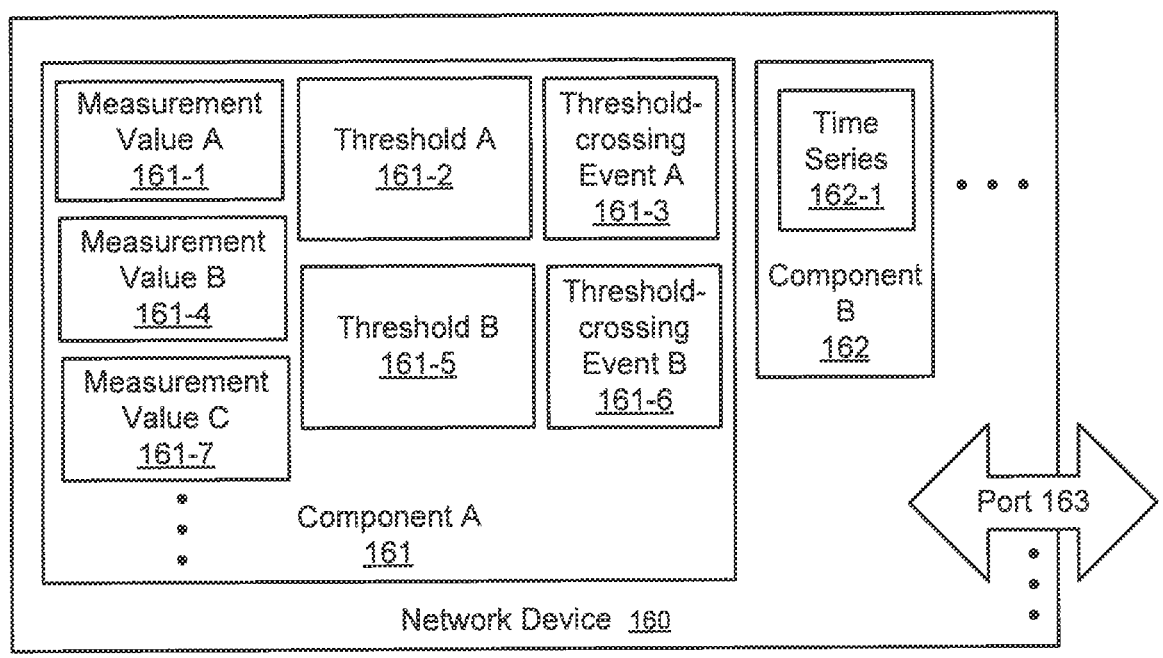
FIG. 1.2

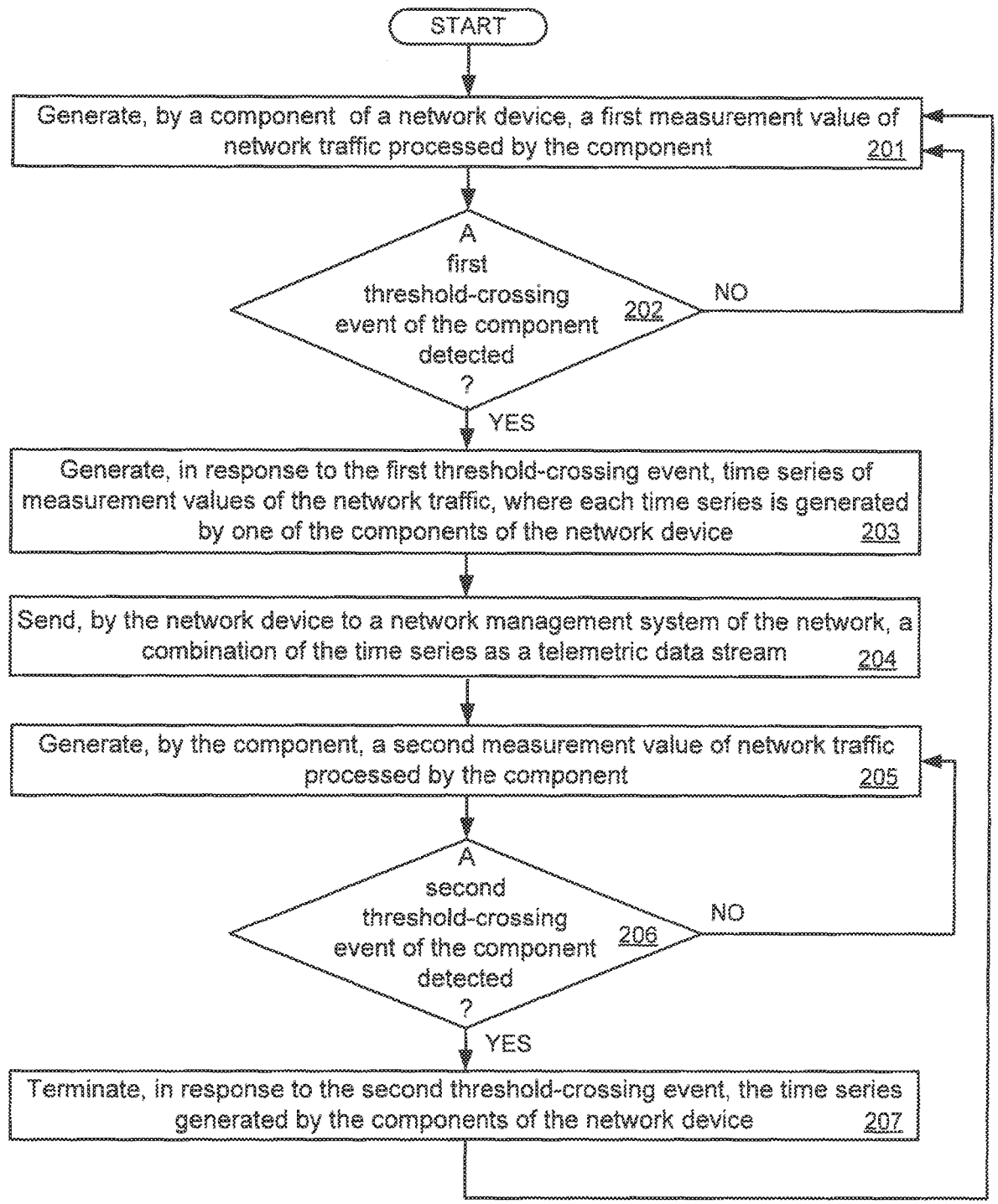
FIG. 2.1

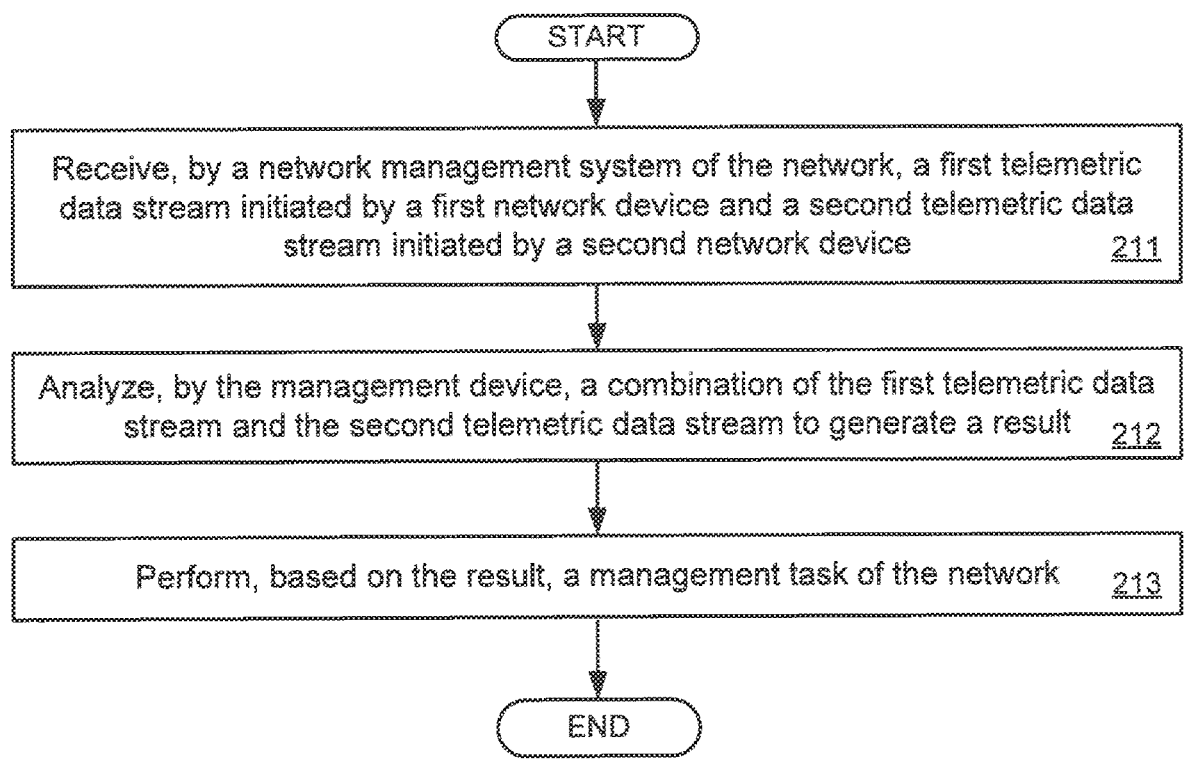
FIG. 2.2

THRESHOLD CROSSING EVENTS FOR NETWORK ELEMENT INSTRUMENTATION AND TELEMETRIC STREAMING

CROSS-REFERENCE TO RELATED APPLICATION(S)

The present application is a continuation of U.S. patent application Ser. No. 15/489,515, filed Apr. 17, 2017, and entitled "Threshold crossing events for network element instrumentation and telemetric streaming," the contents of which are incorporated by reference herein.

BACKGROUND

Telemetry is a communication process by which measurements and other data are collected at remote or inaccessible locations and transmitted to receiving equipment for monitoring. In complex network applications that may scale to extremely high capacities, the huge volume of data collected can overwhelm simple monitoring systems and techniques. For example, the amount of information generated by hundreds/thousands of (web) servers, databases, and additional services is difficult to handle in a meaningful way.

SUMMARY

In general, in one aspect, the invention relates to a method for monitoring a network. The method includes generating a measurement value of network traffic processed by a component of a number of components of a network device. Based on the measurement value meeting a pre-determined criterion, a threshold-crossing event of the component is detected. In response to the threshold-crossing event, a number of time series of measurement values of the network traffic are generated. In particular, each time series is generated by one of the number of components. Accordingly, a combination of the number of time series is sent as a telemetric data stream by the network device to a network management system of the network.

In general, in one aspect, the invention relates to a method for monitoring a network. The method includes receiving, by a network management system of the network, a first telemetric data stream initiated by a first network device and a second telemetric data stream initiated by a second network device. A combination of the first telemetric data stream and the second telemetric data stream is analyzed by the network management system to generate a result. Based on the result, a management task of the network is performed. In particular, the first telemetric data stream includes a number of time series of measurement values of network traffic, where each time series is generated by, and in response to a threshold-crossing event of, one of the components of the first network device. The threshold-crossing event is generated by the component based on a measurement value of the network traffic processed by the component to indicate that the measurement value meets a pre-determined criterion.

In general, in one aspect, the invention relates to a network device of a network. The network device includes a number of components configured to generate a telemetric data stream for sending to a network management system of the network. A component of the number of components is configured to generate a measurement value of network traffic processed by the component. In response to the measurement value meeting a pre-determined criterion, a threshold-crossing event of the component is detected. In response to the threshold-crossing event, each of the number of components is initiated to generate one of a number of time series of measurement values of the network traffic. The telemetric data stream includes a combination of the of the number of time series. By the component and concurrent with the initiating, another measurement value of the network traffic processed by the component is generated. Based on the another measurement value and the pre-determined criterion, another threshold-crossing event of the component is generated. In response to the another threshold-crossing event, the number of time series generated by the components are terminated.

Other aspects of the invention will be apparent from the following description and the appended claims.

BRIEF DESCRIPTION OF DRAWINGS

FIGS. 1.1 and 1.2 show block diagrams of a system in accordance with one or more embodiments of the invention.

FIGS. 2.1 and 2.2 show flowcharts in accordance with one or more embodiments of the invention.

DETAILED DESCRIPTION

Figure 3:
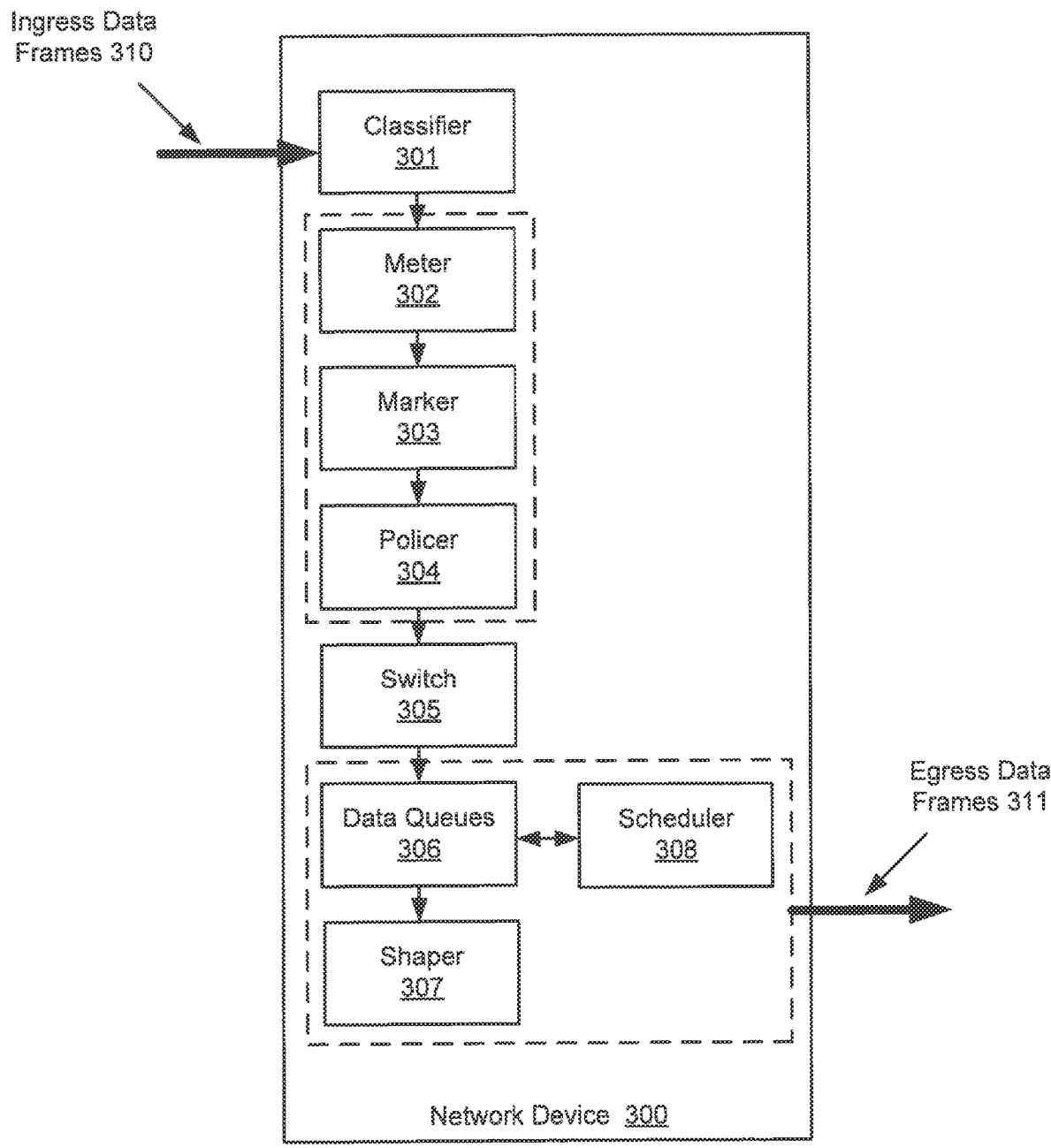
FIG. 3 shows an example in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for monitoring a network in a scalable manner. In particular, state information from network functions (whether physical or virtual) is retrieved as telemetric data streams. The telemetric data streams are triggered by threshold crossing events (TCE) at distinct points within the network element data path. When a TCE is raised, telemetric information starts to be collected until the TCE is cleared. A TCE may be raised as an indication or as a precursor of an abnormal/unexpected event occurring for service traffic flows within the network. Specifically, the TCEs introduce intelligence into data collection for monitoring the network. In one or more embodiments, the TCE based telemetric data streams correlate to dynamic behavior of network traffic patterns, interactions of network elements, and system resource consumptions. Accordingly, the TCE based telemetric data streams provide useful insights into the application behavior for meeting service level agreements (SLAs) and for guiding future decisions on resource planning.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes multiple client devices (e.g., client device X (102-1), client device Y (102-2), client device Z (102-3), etc.) connected by a network (150) in accordance with one or more embodiments. A network is a set of interconnected computing devices that are configured to receive and forward packets in order to transmit information from a source client device to a destination client device. In one or more embodiments of the invention, the network (150) includes one or more of a local area network (LAN), a wide area network (WAN), a telecommunication network, etc, and may include wired and/or wireless portions of the Internet.

In general, the network (150) provides network services to the client devices (e.g., client device X (102-1), client device Y (102-2), client device Z (102-3), etc.). In particular, the network services are provided by one or more service providers operating the network (150) to one or more users of the client devices. For example, one or more client devices (e.g., client device X (102-1), client device Y (102-2), client device Z (102-3), etc.) may be configured to send data over the network (150). Similarly, one or more client devices (e.g., client device X (102-1), client device Y (102-2), client device Z (102-3), etc.) may be configured to receive data over the network (150). In one or more embodiments, the network services allow the client devices (e.g., client device X (102-1), client device Y (102-2), client device Z (102-3), etc.) to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices.

The client devices (e.g., client device X (102-1), client device Y (102-2), client device Z (102-3), etc.) may be computing devices of any type including mobile phones, desktop or tablet personal computers (PCs) used by the users, routers, switches or servers operated by the users for accessing the network (150), or other devices operated by the users. Examples of the client devices (e.g., client device X (102-1), client device Y (102-2), client device Z (102-3), etc.) may correspond to various portions of the computing system described in reference to FIG. 4 below.

Within the network (150), the network device X (106-1), network device Y (106-2), network device Z (106-3), etc., may be computing devices of any type, including servers, routers, switches, etc., operated by one or more service providers of the network (150). Each network device (e.g., network device X (106-1), network device Y (106-2), network device Z (106-3)) may have one or more ports, which are physical and/or logical interfaces for communicating with other network devices. Examples of the network devices (e.g., network device X (106-1), network device Y (106-2), network device Z (106-3)) of the network (150) may correspond to various portions of the computing system described in reference to FIG. 4 below.

Further, a network path (e.g., network path XY (151), network path XZ (152)) between two network devices is a sequence of one or more network links, one or more intermediate elements, and/or any intervening devices that connect the two network devices. A network link may be a connection between two ports residing on two separate network devices (i.e., external link) or within a single network device (i.e., internal link). In one or more embodiments, a network device may be connected to multiple network paths. For example, the network device X (106-1) is connected to the network path XY (151) and the network path XZ (152). In one or more embodiments, multiple network paths may exist between two network devices. Accordingly, packets or other telecommunication data may be exchanged between the two network devices via one or more of the network paths. In one or more embodiments, the network path XY (151) is used to provide the network services to the client device X (102-1), client device Y (102-2), and client device Z (102-3) where the network device X (106-1) and network device Y (106-2) act as the interfaces (i.e., edge network devices) to the network (150). In one or more embodiments, the network (150) includes multiple layers according to a layered network architecture, such as the seven-layer OSI model of computer networking. In such embodiments, the network paths (e.g., network path XY (151)) may include network links, intermediate elements, and/or any intervening devices that support or otherwise are associated with one or more network layers.

As further shown in FIG. 1.1, the network (150) includes a network management system (101) in accordance with one or more embodiments. Network management is the process of administering and managing the network (150). The network management system (101) has many functions including network service provisioning, network monitoring, fault analysis, performance management, etc. In one or more embodiments, network monitoring is performed to monitor the network (150) for detecting slow or failing network device(s) or portions(s) of the network (150) and to notify the service provider(s) in case of outages or other service interruptions. In response to the notification, the network management system (101) may perform one or more network management tasks to mitigate or otherwise address the outages and service interruptions. For example, the network management tasks may include fault analysis and performance management for maintaining quality of service of the network (150).

In one or more embodiments, the network management system (101) is a dedicated device separate from the network devices (e.g., network device X (106-1), network device Y (106-2), network device Z (106-3)) that transmit information between the client devices. In one or more embodiments, at least a portion of the network management system (101) may be distributed and reside within the network devices (e.g., network device X (106-1), network device Y (106-2), network device Z (106-3)) that transmit information between the client devices.

Although FIG. 1.1 only shows three client devices (e.g., client device X (102-1), client device Y (102-2), client device Z (102-3)), three network devices (e.g., network device X (106-1), network device Y (106-2), network device Z (106-3)), and two network paths (e.g., network path XY (151), network path XZ (152)), those skilled in the art, having the benefit of this detailed description, will appreciate that the system (100) may have any number of client devices, network devices, and network paths. Further, different network paths may share one or more devices or have different devices altogether.

FIG. 1.2 shows a network device (160) in accordance with one or more embodiments. In particular, the network device (160) includes example details of a device (e.g., network device X (106-1), network device Y (106-2), network device Z (106-3)) that transmit client information between the client devices (e.g., client device X (102-1), client device Y (102-2), client device Z (102-3), etc.) depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the network device (160) includes multiple components (e.g., component A (161), component B (162), etc.) coupled to one or more ports (e.g., port (163)). A component is a subset of the network device (160) configured to perform a specific function (e.g., input, output, switching, queuing, monitoring, etc.) in processing network traffic received/transmitted by the network device (160). Each of these components may include a software component, a hardware component, or a combination thereof.

In one or more embodiments, each of the components (e.g., component A (161), etc.) is configured to generate measurement values (e.g., measurement value A (161-1), measurement value B (161-4), measurement value C (161-7), etc.) of network traffic processed by the component (e.g., component A (161), etc.). The measurement value is the result of measuring the network traffic. For example, the network traffic may include data packets or data frames received or sent via the port (163). A data frame is a sequence of data packets that include a payload and associated control information. For example, the measurement value A (161-1) may include a numeric value and/or symbolic value (e.g., text or graphical symbol) resulting from measuring the data frames processed by the component A (161).

In one or more embodiments, the network traffic is dynamic and the measurement values may vary with time. A threshold crossing event is an occurrence of the time varying measurement values crossing over a threshold with respect to a pre-determined criterion. A threshold is a pre-determined numeric value and/or symbolic value for comparison. For example, the pre-determined criterion may specify the measurement value changing from being less than the threshold to being larger than the threshold. In another example, the pre-determined criterion may specify the measurement value changing from being larger than the threshold to being less than the threshold. In yet another example, the pre-determined criterion may specify the measurement value alternating within a time period and/or a set of number of times between being larger than the threshold and being less than the threshold. In one or more embodiments, the component A (161) evaluates the measurement values (e.g., measurement value A (161-1), measurement value B (161-4), measurement value C (161-7), etc.) with respect to pre-determined criteria (i.e., based on threshold A (161-2) and/or threshold B (161-5)) to detect corresponding threshold-crossing events (i.e., threshold-crossing event A (161-3), threshold-crossing event B (161-6)). For example, the threshold-crossing event A (161-3) may be detected when a measurement value (e.g., measurement value A (161-1)) exceeds the threshold A (161-2). In one or more embodiments, the threshold-crossing event A (161-3) includes a record maintained by the component A (161) that describes the event of the measurement value A (161-1) exceeding the threshold A (161-2). In addition, the record may also include context information, such as a time stamp or other attributes of the network traffic corresponding to when the threshold-crossing event A (161-3) is detected.

In one or more embodiments, the threshold A (161-2) and threshold B (161-5) are defined to provide hysteresis in detecting the threshold-crossing events. Hysteresis is the dependence of the state of a system on history. In other words, detecting the threshold-crossing events may be dependent on whether any other threshold-crossing event has previously been detected. For example, subsequent to the threshold-crossing event A (161-3), the threshold-crossing event B (161-6) may be detected when the measurement value (e.g., measurement value B (161-4)) becomes less than the threshold B (161-5). Further subsequent to the threshold-crossing event B (161-6), the threshold-crossing event A (161-3) may be detected again when yet another measurement value (not shown) exceeds the threshold A (161-2). In one or more embodiments, the threshold-crossing event B (161-6) includes a record maintained by the component A (161) that describes the event of the measurement value B (161-4) becomes less than the threshold B (161-5). In addition, the record may also includes context information, such as a time stamp or other attributes of the network traffic corresponding to when the threshold-crossing event B (161-6) is detected.

In one or more embodiments, threshold-crossing events are detected at distinct points (e.g., network device X (106-1), network device Y (106-2), network device Z (106-3)) within the network (150). When a threshold-crossing event is detected, telemetric information starts to be collected until the event is cleared. In other words, the telemetric information is terminated when the pre-determined criterion of the threshold crossing event is no longer met. In one or more embodiments, a threshold-crossing event is an indication or a precursor of an abnormal/unexpected event occurring for network traffic flowing within the network (150). For example, a threshold-crossing event may correspond to an excess amount of traffic is being policed/dropped, which may be an indication of an end user trying to transmit too much information into the network (150). In another example, a threshold-crossing event may correspond to forwarding table entries, associated with a given MAC address, switching back and forth between ports indicating a loop within the network (150). In yet another example, a threshold-crossing event may correspond to queue fill rates exceeding a certain threshold, which may indicate a network congestion leading to packet dropping. In still another example, a threshold-crossing event may correspond to data packets being dropped at a queue due to encountering a WRED (weighted random early detection) curve. In still another example, a threshold-crossing event may correspond to excessive ACL (access control list) denies, which may indicates a rogue device trying to access the network (150).

Returning to the discussion of FIG. 1.2 above, in one or more embodiments, the component A (161) is further configured to initiate, in response to the threshold-crossing event A (161-3), each of the components (e.g., component A (161), component B (162), etc.) to generate a time series of measurement values of the network traffic processed by the respective component. A time series is a series of data points indexed in time order. For example, a time series may include a sequence of measurement values taken at successive equally spaced points in time, such as the measurement value C (161-7) and subsequent measurement values generated by the component A (161). The measurement value C (161-7) and subsequent measurement values form a time series of the component A (161) that may be initiated in response to the threshold-crossing event A (161-3). Similarly, the time series (162-1) includes measurement values generated by the component B (162) that may also be initiated in response to the threshold-crossing event A (161-3). In one or more embodiments, multiple time series generated by the components (e.g., component A (161), component B (162), etc.) of the network device (160) are aggregated into a telemetric data stream that is sent by the network device (160) to the network management system (101) depicted in FIG. 1.1 above. In one or more embodiments, the network management system (101) analyzes the telemetric data stream to extract meaningful statistics and/or other characteristics of the data for detecting anomalies such as slow or failing devices in the network (150).

As noted above, subsequent to the threshold-crossing event A (161-3), the component A (161) may detect the threshold-crossing event B (161-6) when the measurement value (e.g., measurement value B (161-5)) becomes less than the threshold B (161-5). In one or more embodiments, the component A (161) is further configured to terminate, in response to threshold-crossing event B (161-6), the time series generated by the components (e.g., component A (161), component B (162), etc.) of the network device (160). Accordingly, the telemetric data stream is terminated in response to threshold-crossing event B (161-6).

FIG. 2.1 shows a flowchart in accordance with one or more embodiments. The process shown in FIG. 2.1 may be executed, for example, by one or more components discussed above in reference to FIGS. 1.1-1.2. One or more steps shown in FIG. 2.1 may be omitted, repeated, and/or performed in a different order among different embodiments of the invention. Accordingly, embodiments of the invention should not be considered limited to the specific number and arrangement of steps shown in FIG. 2.1.

Initially, in Step 201, a first measurement value of network traffic processed by a component of a network device is generated. In one or more embodiments, the first measurement value is generated by one of a number of components of the network device. For example, the components may include a classifier component, a metering component, a switching component, a queuing component, etc.

In Step 202, a determination is made as to whether a first threshold-crossing event of the component is detected. In one or more embodiments, the first threshold-crossing event is detected based on the first measurement value meeting a first pre-determined criterion. For example, the first threshold-crossing event may be detected based on the first measurement value exceeding a first pre-determined threshold.

In one or more embodiments, the determination is made by the particular element of the network device that generates the first measurement value.

If the determination is negative in Step 202, i.e., no threshold-crossing event of the component is detected based on the first measurement value, the method returns to Step 201. If the determination is positive in Step 202, i.e., a first threshold-crossing event of the component is detected based on the first measurement value, the method proceeds to Step 203.

In Step 203, a number of time series of measurement values of the network traffic is generated. In particular, each time series is generated, in response to the first threshold-crossing event, by one of the components of the network device. In one or more embodiments, each particular component detects the threshold crossing-event and generates a time series based on data frames processed by the particular component.

In Step 204, a combination of the number of time series is sent, by the network device to a network management system of the network, as a telemetric data stream. In one or more embodiments, the number of time series are aggregated to form the telemetric data stream. For example, different time series may be aggregated based on time stamps of the measurement values, based on individual components, or based on other criteria.

In Step 205, a second measurement value of the network traffic processed by the component is generated. In particular, the second measurement value is generated by the component concurrently with the network device sending the telemetric data stream in Step 204 above. In other words, the second measurement value is generated in a time span during which the time series are sent as the telemetric data stream.

In one or more embodiments, the second measurement value and the first measurement value correspond to measurements of the same network parameter performed at different time points. In one or more embodiments, the second measurement value and the first measurement value correspond to measurements of the different network parameters performed at different time points.

In one or more embodiments, the second measurement value and the first measurement value correspond to measurements generated by the same component of the network. In one or more embodiments, the second measurement value and the first measurement value correspond to measurements generated by different components of the network.

In Step 206, a determination is made as to whether a second threshold-crossing event of the component is detected. In one or more embodiments, the second threshold-crossing event is detected based on the second measurement value meeting a second pre-determined criterion. For example, the second threshold-crossing event may be detected based on the second measurement value being less than a second pre-determined threshold. In one or more embodiments, the second pre-determined threshold may be the same as the first pre-determined threshold. In one or more embodiments, the second pre-determined threshold may be different from the first pre-determined threshold.

If the determination is negative in Step 206, i.e., no threshold-crossing event of the component is detected based on the second measurement value, the method returns to Step 205. If the determination is positive in Step 206, i.e., a second threshold-crossing event of the component is detected based on the second measurement value, the method proceeds to Step 207.

In Step 207, the number of time series generated by the components of the network device is terminated in response to second threshold-crossing event. Accordingly, the telemetric data stream is terminated. Subsequently, the method returns to Step 201.

FIG. 2.2 shows a flowchart in accordance with one or more embodiments. The process shown in FIG. 2.2 may be executed, for example, by one or more components discussed above in reference to FIGS. 1.1-1.2 and based on the method described in reference to FIG. 2.1 above. One or more steps shown in FIG. 2.2 may be omitted, repeated, and/or performed in a different order among different embodiments of the invention. Accordingly, embodiments of the invention should not be considered limited to the specific number and arrangement of steps shown in FIG. 2.2.

Initially in Step 211, a first telemetric data stream initiated by a first network device and a second telemetric data stream initiated by a second network device are received by a network management system of the network. In one or more embodiments, the first network device and second network device are part of a network path of the network. In one or more embodiments, the first telemetric data stream and the second telemetric data stream are sent by the first network device and second network device, respectively, using the method described in reference to FIG. 2.1 above.

In Step 212, a combination of the first telemetric data stream and the second telemetric data stream is analyzed by the network management system to generate a result. For example, the result may predict or otherwise indicate slow or failing network devices, outages or other service interruptions of the network, etc. When the first network device and second network device are part of a network path, the result may be used to perform a path level diagnostic. The path level diagnostic is analysis of the result to identify slow or failing portion of the network path, outages or other service interruptions of the network path, etc.

In Step 213, a management task of the network is performed based on the result. For example, a preventive measure or other maintenance tasks may be performed to address the an issue of the network.

FIG. 3 shows an example in accordance with one or more embodiments of the invention. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

As shown in FIG. 3, the network device (300) is an example of the network device (160) depicted in FIG. 1.2 above. Specifically, the components depicted in the network device (160) correspond to the classifier (301), meter (302), marker (303), policer (304), switch (305), data queues (306), shaper (307), and scheduler (308) that form a data path of the network device (300). The components of the network device (300) collectively process network traffic (i.e., ingress data frames (310)) received by the network device (300) to transmit the corresponding egress data frames (311). In other words, the ingress data frames (310) pass through the data path and are classified, metered, marked, policed, switched queued, shaped, and scheduled in various intermediate forms to become the egress data frames (311). Each of the components performs specific function of the network device (300). In addition, a component may generate a particular threshold-crossing event (TCE) based on the particular intermediate form of data frames processed by the component.

As noted above, the specific TCE generated by each component of the network device (300) may be used to predict when anomalies may occur within the network, thus triggering the collection and streaming of telemetric data. The ability of each component of the network device (300) to start and stop collection and streaming of telemetric data based upon TCEs provides a mechanism to select data of interest from the network device. Accordingly, the telemetric data is transmitted in a structured format to a remote network management system for monitoring. Utilization of the TCEs provides intelligence into monitoring data collection strategies. In other words, monitoring data is only streamed from the network device (300) if individual component detects that something unusual is about to happen. In this manner, the telemetric data stream provides near-real-time access to the monitoring data. The monitoring data is continuously streamed out of each component for the network management system to act on.

For example, the network device (300) may be a network switch or router that classifies the ingress data frames (310) to take an action based upon the classification. The classifier (301) identifies the ingress data frames (310) using certain information found within the frame/packet to determine whether the incoming traffic is authorized based on an access control list (ACL). Non-authorized traffic is denied access and excessive ACL denials is an indication of a rogue device trying to access the network via the network device (300). In this example, the TCE may be generated by the classifier (301) upon detecting that an ACL denial statistic exceeds a preset threshold. If this TCE is detected, the classifier (301) identifies a flow signature associated with the ACL denials and initiates time series data collection based on the flow signature. For example, each of the classifier (301), meter (302), marker (303), policer (304), switch (305), data queues (306), shaper (307), and scheduler (308) performs periodic measurements when processing data frames associated with the flow signature. Each component generates a result that is a time series of measurement values. The time series of all components are then aggregated to be sent to the network management system as the telemetric data stream.

In another example, the meter (302) is a component that measures rate and burst size of network traffic from a client to the network device (300). The marker (303) is a component that encodes a "color" on the frame (or packet). A "color" may be either green, yellow, or red. "Green" indicates that traffic is within profile (i.e., within a client contract and considered committed/guaranteed delivery). "Yellow" indicates the traffic is outside of profile (i.e., considered best effort delivery). "Red" indicates excessive violation of the profile such that the traffic is be dropped without delivery through the network (300). The policer (304) is a component that prevents "red" frames from entering the network. Excessive amount of traffic that triggers alerts of the marker (303) or policer (304) is an indication of an end user attempting to transmit too much information into the network. In this example, the TCE may be generated by the meter (302), marker (303), or policer (304) upon detecting that a measure of the traffic alerts (e.g., amount of traffic being policed or dropped) exceeds a preset threshold. If this TCE is detected, the classifier (301) identifies a service associated with the traffic alerts and initiates time series data collection based on the service. For example, each of the classifier (301), meter (302), marker (303), policer (304), switch (305), data queues (306), shaper (307), and scheduler (308) performs periodic measurements when processing data frames associated with the service. Each component generates a result that is a time series of measurement values. The time series of all components are then aggregated to be sent to the network management system as the telemetric data stream.

In yet another example, the switch (305) is a component that performs switching (e.g., forwarding, routing) function within the network device (300). In other words, the switch (300) selects which egress port to dispatch the frame/packet to based on based on address information of the frame/packet. Various tables are used by the switch (305) to perform such switching function. Port flapping (i.e., switching back and forth between ports) found in forwarding table entries associated with a particular MAC address is an indication of a loop within the network. In this example, the TCE may be generated by the switch (305) upon detecting that a measure of the port flapping exceeds a preset threshold. If this TCE is detected, the switch (305) identifies the flow causing the port flapping and initiates time series data collection based on flow. For example, each of the classifier (301), meter (302), marker (303), policer (304), switch (305), data queues (306), shaper (307), and scheduler (308) performs periodic measurements when processing data frames associated with the flow. Each component generates a result that is a time series of measurement values. The time series of all components are then aggregated to be sent to the network management system as the telemetric data stream.

In addition to the forwarding table, the switch (305) may detect another TCE based on other table entries approaching the limit of the preset table size. If this TCE is detected, the switch (305) initiates time series data collection based along the data path. For example, each of the classifier (301), meter (302), marker (303), policer (304), switch (305), data queues (306), shaper (307), and scheduler (308) performs periodic measurements when processing data frames along the data path. Each component generates a result that is a time series of measurement values. The time series of all components are then aggregated to be sent to the network management system as the telemetric data stream.

In still another example, the data queues (306), shaper (307), and scheduler (308) are components that buffer and schedule data packets to be dispatched out an egress port. Queue fill rates exceeding a preset threshold is an indication of network congestion, and occurs prior to a queue tail drop scenario. In this example, the TCE may be generated the data queues (306), shaper (307), or scheduler (308) upon detecting that one or more queue fill rates exceed a preset threshold. Alternatively, the TCE may be generated when packets are being dropped at a queue due to encountering a WRED (weighted random early detection) curve. If this TCE is detected, the data queues (306), shaper (307), or scheduler (308) identifies the flow causing the network congestion and initiates time series data collection based on flow. For example, each of the classifier (301), meter (302), marker (303), policer (304), switch (305), data queues (306), shaper (307), and scheduler (308) performs periodic measurements when processing data frames associated with the flow. Each component generates a result that is a time series of measurement values. The time series of all components are then aggregated to be sent to the network management system as the telemetric data stream.

Additional TCEs may also be based upon CPU utilization and/or memory utilization. This may be particularly useful for virtual network functions, as well as physical network functions.

Figure 4:
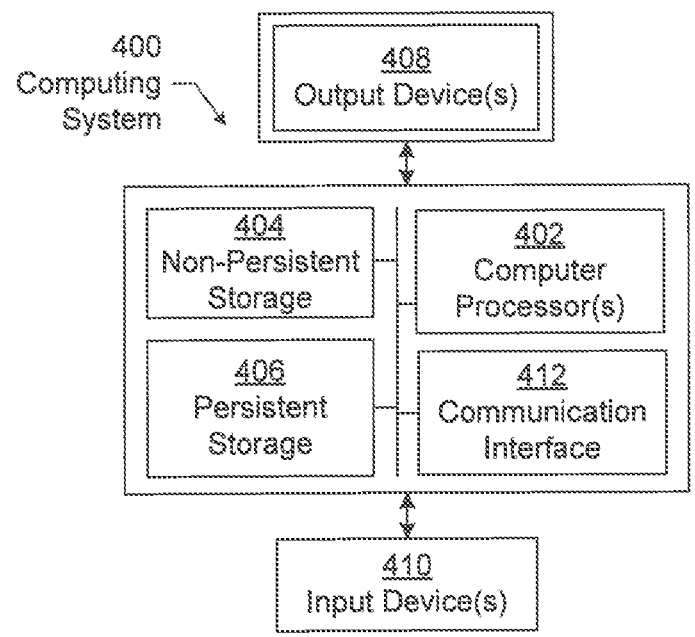
FIG. 4 shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 4, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network device comprising:
a plurality of ports;
a switch configured to switch data frames between the plurality of ports; and
a processor configured to
obtain one or more measurement values based on network traffic associated with the data frames,
responsive to detection of a threshold-crossing event of a measurement value, wherein the threshold-crossing event is one of an indication and a precursor of one or more of an abnormal and unexpected event associated with the network traffic, initiate collection of a plurality of time series of measurement values of the network traffic by one or more components in the network device, wherein at least one of the measurement values of the plurality of time series of measurement values is different from the one or more measurement values, and
send a combination of the plurality of time series as a telemetric data stream for analysis by a network management system related to the abnormal/unexpected event.

2. The network device of claim 1, wherein the combination of the plurality of time series correlate to one or more of dynamic behavior of network traffic patterns, interactions of network elements, and system resource consumption in the network device.

3. The network device of claim 1, wherein, responsive to a result from the network management system, a management task is performed for the network device.

4. The network device of claim 1, wherein the collections is performed until the threshold-crossing event is cleared.

5. The network device of claim 1, wherein the threshold-crossing event relates to an excess amount of the network traffic being one or more of policed and dropped.

6. The network device of claim 1, wherein the threshold-crossing event relates to forwarding table entries, associated with a given Media Access Control (MAC) address, switching back and forth between ports indicating a loop within a network.

7. The network device of claim 1, wherein the threshold-crossing event relates to network congestion affecting the network traffic, and wherein the network congestion is detected based on queue fill rates.

8. The network device of claim 1, wherein the threshold-crossing event relates to network congestion affecting the network traffic, and wherein the network congestion is detected based on one or more of queue fill rates and packet drops.

9. The network device of claim 1, wherein the network device includes a plurality of components including the plurality of ports and the switch, wherein each component performs a specific function in processing of the network traffic.

10. A method comprising:
in a network device, obtaining one or more measurement values based on network traffic associated with data frames;
detecting a threshold-crossing event of a measurement value, wherein the threshold-crossing event is one of an indication and a precursor of one or more of an abnormal and unexpected event associated with the network traffic;
responsive to the detecting, initiating collection of a plurality of time series of measurement values of the network traffic by one or more components in the network device, wherein at least one of the measurement values of the plurality of time series of measurement values is different from the one or more measurement values; and
sending a combination of the plurality of time series as a telemetric data stream for analysis by a network management system related to the abnormal/unexpected event.

11. The method of claim 10, wherein the combination of the plurality of time series correlate to one or more of dynamic behavior of network traffic patterns, interactions of network elements, and system resource consumption in the network device.

12. The method of claim 10, wherein, responsive to a result from the network management system, a management task is performed for the network device.

13. The method of claim 10, wherein the collecting is performed until the threshold-crossing event is cleared.

14. The method of claim 10, wherein the threshold-crossing event relates to an excess amount of the network traffic being one or more of policed and dropped.

15. The method of claim 10, wherein the threshold-crossing event relates to forwarding table entries, associated with a given Media Access Control (MAC) address, switching back and forth between ports indicating a loop within a network.

16. The method of claim 10, wherein the threshold-crossing event relates to network congestion affecting the network traffic, and wherein the network congestion is detected based on queue fill rates.

17. The method of claim 10, wherein the threshold-crossing event relates to network congestion affecting the network traffic, and wherein the network congestion is detected based on one or more of queue fill rates and packet drops.

18. The method of claim 10, wherein the network device includes a plurality of components including the plurality of ports and the switch, wherein each component performs a specific function in processing of the network traffic.

19. A computing system comprising:
a processor; and
memory storing instructions that, when executed, cause the processor to
receive a combination of a plurality of time series of measurement values of network traffic from one or more network devices in a network, wherein each network device is configured to initiate collection of associated time series responsive to detection of a threshold-crossing event, wherein the threshold-crossing event is one of an indication and a precursor of one or more of an abnormal and unexpected event associated with the network traffic, wherein at least one of the measurement values of the plurality of time series of measurement values is different from one or more measurement values associated with the threshold-crossing event,
analyze the combination of a plurality of time series to extract meaningful statistics for detecting the one or more of the abnormal and unexpected event, and
determine a management task that is to be performed in the network based on the one or more of the abnormal and unexpected event.

20. The computing system of claim 19, wherein the meaningful statistics are utilized to determine a result that indicates any of a slow network device, a failing network device, an outage, and a service interruption.

* * * * *